April 20, 1965   G. P. HAMNER ETAL   3,179,584
OIL COKING WITH INCREASED HYDROGEN PRODUCTION
Filed Feb. 23, 1962
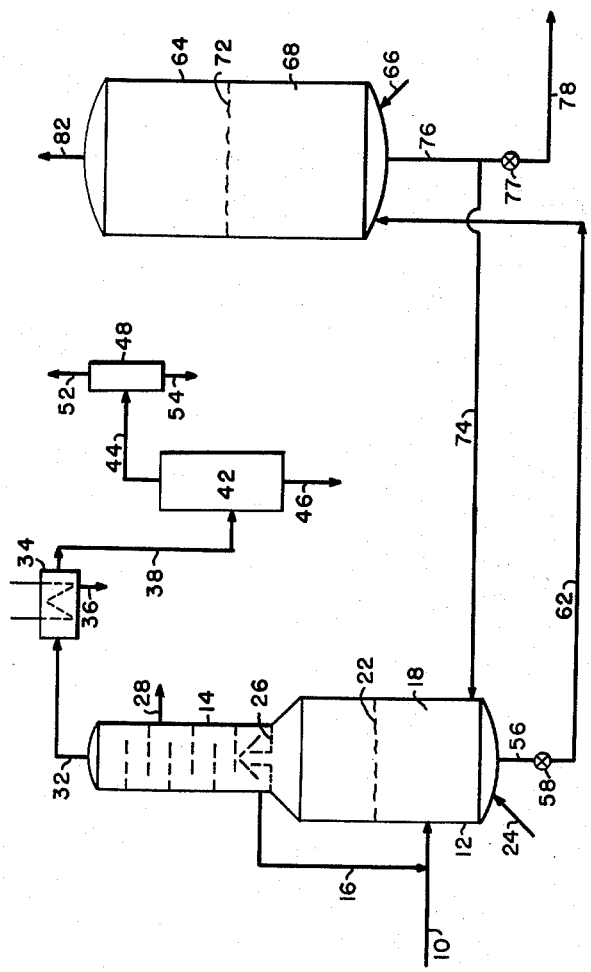
Glen Porter Hamner
Karsten Herbert Moritz   Inventors
William Joseph Metrailer
By *George J. Silhavy*
Patent Attorney

United States Patent Office

3,179,584
Patented Apr. 20, 1965

3,179,584
OIL COKING WITH INCREASED HYDROGEN PRODUCTION
Glen Porter Hamner, Baton Rouge, La., Karsten Herbert Moritz, North Plainfield, N.J., and William Joseph Metrailer, Baton Rouge, La., assignors to Esso Research and Engineering Company, a corporation of Delaware
Filed Feb. 23, 1962, Ser. No. 174,948
6 Claims. (Cl. 208—106)

This invention relates to a process for producing hydrogen and more particularly relates to hydrogen production in fluid coking.

During coking in the fluid coking process some gas is produced and this gas contains only a minor quantity of hydrogen. With the present invention the amount of hydrogen in the gas from fluid coking is increased many fold. In the processing of residual oils in fluid coking it was unexpectedly discovered that the addition of an alkaline inorganic compound to the residual oil feed being passed to the reactor or coker vessel increases the amount of hydrogen in the gas produced in fluid coking while coking the residual oil to produce lower boiling hydrocarbons.

It has been found that the addition of alkaline material such as an aqueous solution of sodium hydroxide or potassium hydroxide to the oil feed going to the coking vessel increases the amount of hydrogen formed during coking. The carbonate or oxide form of the alkali metal may be used. The alkali compound preferably in aqueous solution is mixed or emulsified with the oil feed at an elevated temperature so that the temperature of the mixture is below about 300° F. and preferably at about 200° F. The resulting mixture is then coked at coking temperatures to produce lower boiling hydrocarbons and a hydrogen-rich gaseous stream. Best results are obtained by minimizing high temperature contact time of the caustic or other alkali compound and the residual oil feed prior to processing in the coker reactor.

The concentration of the sodium hydroxide, potassium hydroxide, sodium carbonate or potassium carbonate in water as an aqueous solution may be between about 5 and 50 wt. percent. The amount of alkali compound solution used on the oil feed is between about 1 wt. percent and 20 wt. percent.

In the drawing the figure diagrammatically represents one form of apparatus for carrying out the invention.

Referring now to the drawing the reference character 10 designates a line for feeding the oil charge to the coker reactor 12, which is a vertically arranged cylindrical vessel. In the present invention the oil feed is premixed with an alkali compound or alkali salt such as sodium hydroxide, sodium carbonate, potassium hydroxide, potassium carbonate etc. Preferably, the alkali compound is in an aqueous solution and the solution and oil feed are mixed to form an emulsified mixture.

The oil feed is a heavy residual oil feed or the like such as heavy crude petroleum, crude oil residua, vacuum still residues, tars, pitches etc. Such oil feeds have an initial boiling point of about 650° F. or higher, an A.P.I. gravity between about 0° and 20° and a Conradson carbon residue content of about 5 to 40 wt. percent.

Arranged above the coker reactor 12 is stripper fractionator vessel 14 where the coker products from the reactor 12 are fractionated to separate a bottoms fraction which is recycled to the oil feed line 10 through line 16.

The residual oil feed is emulsified with about 1 to 20% by weight on the oil feed an aqueous sodium hydroxide solution containing about 5 to 50% by weight of the alkali hydroxide. The mixture is preheated to a temperature between about 100° F. and 800° F., preferably at a temperature between about 150° and 350° F., in any suitable manner, and is then fed into the coker reactor 12 into the dense fluidized turbulent bed of coke 18 therein having a level indicated at 22. The emulsified oil feed is coked or cracked at a temperature between about 850° F. and 1250° F. in the coker vessel 12, preferably at a temperature between about 900° F. and 950° F., between about 0 and 200 p.s.i.g. and a feed contact or residence time in said reactor 12 of between about 1 and 50 seconds, preferably less than 20 seconds contact time. Or the oil feed rate may be between about 0.1 and 10 w./hr./w. (weight of oil per hour per weight of solids), preferably between about 0.3 and 2.0 w./hr./w.

Steam is introduced into the lower portion of coker vessel 12 through line 24 in an amount between about 5 and 50 wt. percent on the oil feed, preferably between about 10 and 20 wt. percent on the oil feed. The steam and the cracked vapors and gases passing up through the bed of coke solids maintain the solids as a dense fluidized turbulent bed of solids. The superficial velocity of the gaseous material flowing up through the solids bed 18 is between about 0.5 and 5.0 feet/sec., preferably between about 1.0 and 3.0 feet/sec.

Heat is supplied to the coker vessel 12 by burning part of the coke in a separate vessel and returning the heated coke particles to the coker vessel as will be described hereinafter. The coke particles are of a size between about 44 and 1000 microns, preferably between about 100 and 450 microns.

The cracked and coked vaporous products pass overhead through bubblecap plate 26 into the stripper fractionator 14 to separate high boiling products from lower boiling hydrocarbons and gases. The bottoms from fractionator 14 are recycled to extinction by being recycled through lines 16 and 10 to the bed 18 in coker vessel 12. The recycle stream may vary in initial boiling point from above 650° F. to about 1000° F. depending on the desired disposition of the coker products.

A gas oil fraction is removed through line 28 from an intermediate portion of fractionator 14. The gasoline and lighter vaporous products go overhead through line 32 and are cooled by passing through condenser 34 to condense steam which is removed as water from the bottom of condenser 34 through line 36. Condensed and uncondensed hydrocarbons and gases are withdrawn from an intermediate portion of condenser 34 through line 38 and passed to a separate fractionating tower 42 where the naphtha fraction is stabilized by removing $C_4$ and lighter overhead through line 44 and the $C_5$ to 430° F. fraction is withdrawn through line 46 leading from the bottom portion of the tower 42.

The $C_4$ and lighter products are passed to a separate fractionating tower 48 and a hydrogen-rich stream containing some hydrocarbons is removed as an overhead product by line 52 and the $C_2$–$C_4$ fraction is removed as a bottoms product from tower 48 through line 54 for further processing. The hydrogen-rich gas containing more than about 65 mol percent hydrogen may be recovered as such and used in hydrogenating processes, may be recycled to the coking vessel 12, compressed for hydrotreating coker liquid products or further purified and concentrated before being utilized in hydrotreating.

Returning now to the coke products and coker vessel 12, coke particles are withdrawn from the lower portion of vessel 12 through line 56 and slide valve or the like 58 and passed through line 62 to the burner vessel 64 which is a vertically arranged cylindrical vessel. Where sodium hydroxide is used with the oil feed, the coke product contains sodium hydroxide, or soda. Air or other oxygen containing gas is introduced into the lower portion of burner vessel 64 through line 66 to burn part of the coke to heat the coke particles and also to form a dense turbulent fluidized bed 68 of coke particles having a level indicated at 72. The combustion gases passing up through the burner vessel 64 also act to fluidize the coke solids in the vessel. The superficial velocity of the gases passing up through the burner vessel 64 is between about 1.0 and 5.0 feet/sec.

The coke particles heated to a temperature between about 100° F. and 300° F. hotter than the coke particles in the coker vessel 12 are recycled in part to the coker vessel 12 through line 74 which communicates with bottom drawoff line 76 leading from burner vessel 64. Line 74 empties into the dense fluid turbulent bed 18 in coker vessel 12. Drawoff line or standpipe 76 has a control slide valve or the like 77 for withdrawing green coke as product from the process. There is an excess of coke over that required to supply heat to the coker vessel 12. The coke withdrawn as product through line 78 contains alkali compounds which may be removed by water washing if an alkali free coke is desired.

The combustion gases leave the top of the burner vessel 64 through line 82. Preferably dust separators will be provided for separating solids from gaseous products leaving the top of burner vessel 64 and also the top of coker reactor 12. Conventional dust separators such as one or more cyclone separators may be used.

EXAMPLE 1

In one example, South Louisiana vacuum residuum was coked in a batch fluid coking unit at 950–960° F., 0.2 w./hr./w., and 10 wt. percent steam. The sodium hydroxide solution contained 50 parts by weight of sodium hydroxide per 100 parts by weight of water and where the emulsion process was used, about 10 parts by weight of the sodium hydroxide solution per 100 parts by weight of oil feed were used. Where the sodium hydroxide was used as a dry chemical solid, about 5 wt. percent on the oil feed was used. When using the sodium hydroxide aqueous solution, the solution and the oil feed were emulsified by mixing in a stirred autoclave at about 200° F. Where the solid sodium hydroxide was used, it was mixed in a similar manner as above with the oil at a temperature of about 600° F. for approximately one hour.

*Batch fluid coking of South Louisiana vacuum residuum*

[950°–960° F., 0.2 w./hr./w., 10% steam]

| Pretreatment Prior to Coking | None | Sodium Hydroxide (5 Wt. Percent on Oil) | |
|---|---|---|---|
| | | Emulsion at 200° F. | Chemical at 600° F. |
| Product Yields, Wt. Percent: | | | |
| $H_2$ | 0.1 | 1.0 | 0.2 |
| $C_1$–$C_3$ | 8.0 | 4.9 | 7.2 |
| $C_4$ | 1.6 | 1.2 | 1.5 |
| $C_5$–430° F. | 13.6 | 9.3 | 11.2 |
| 430–650° F. | 8.3 | 11.6 | 12.0 |
| 650° F.+ | 50.4 | 50.3 | 51.2 |
| Coke | 18.0 | 21.7 | 16.7 |

*Gas composition*

[Mol Percent on $C_4$ and lighter]

| Pretreatment Prior to Coking | None | NaOH (5 Wt. Percent on Oil) | |
|---|---|---|---|
| | | Emulsion at 200° F. | Chemical at 600° F. |
| $H_2$ | 17.0 | 71.4 | 28.1 |
| $C_1$ | 42.5 | 14.1 | 35.7 |
| $C_2$ unsat. | 6.9 | 2.8 | 6.0 |
| $C_2$ | 13.5 | 4.4 | 12.1 |
| $C_3$ unsat. | 6.8 | 2.5 | 5.1 |
| $C_3$ | 6.2 | 1.9 | 5.5 |
| $C_4H_6$ | 0.5 | 0.1 | 0.3 |
| $C_4H_8$ | 4.2 | 1.9 | 3.5 |
| Iso-$C_4H_{10}$ | 0.3 | 0.3 | 0.5 |
| n-$C_4H_{10}$ | 1.7 | 0.6 | 1.4 |

From the above data it will be apparent that a process has been disclosed whereby the amount of hydrogen produced during coking of residual oils may be greatly increased and hydrogen-rich gas produced. The hydrogen concentration can be further concentrated by separating $C_1$ to $C_4$ hydrocarbon from the mixture, if desired. Also it will be seen that the use of the oil feed-sodium hydroxide solution emulsion at 200° F. gives much superior results to using the solid sodium hydroxide added as such to the oil feed and treated for one hour at a temperature of 600° F.

The hydrogen producing process may be used with a moving bed of coke solids or as a delayed coking process. Instead of using pure chemicals such as sodium hydroxide etc. impure or partially pure chemicals such as waste caustic solutions may be used. Also mixtures of sodium hydroxide and sodium carbonate or of other alkali salts may be used.

EXAMPLE 2

In another example a refinery spent caustic solution was used. The solution was concentrated by distillation to remove excess water. The caustic concentrate had the following composition:

| | Weight percent |
|---|---|
| NaOH | 25 |
| $Na_2CO_3$ | 16.5 |
| Organic material | 6.5 |
| Na salts | 2 |
| $H_2O$ | 50 |

South Louisiana vacuum residuum was emulsified at about 200° F. with 10 wt. percent on the residuum oil feed of the above spent caustic concentrate. The emulsified feed coked under the same conditions given above in Example 1 and a gas sample was obtained having the following composition:

| Components: | Mol percent |
|---|---|
| $H_2$ | 78.3 |
| $CO_2$ | 0.2 |
| $C_1$ | 10.4 |
| $C_2$ | 4.5 |
| $C_3$ | 3.7 |
| $C_4$ | 2.9 |

Here again it is apparent that a process has been disclosed where a hydrogen-rich gas can be produced from a residual oil by coking in the presence of an alkali compound or compounds initially formed as an aqueous solution and emulsified with the residuum oil feed at a temperature of about 200° F. going to the coker or coking step.

What is claimed is:

1. A method of increasing the hydrogen content of gas produced during coking of hydrocarbon oils which comprises admixing an aqueous solution of an alkali metal compound selected from the group consisting of sodium hydroxide, sodium carbonate, potassium hydroxide, potassium carbonate or mixtures thereof with a residual hydrocarbon oil having an initial boiling point of at least about 650° F. to emulsify the oil and water at a temperature between about 150° F. and 300° F. and coking the emulsified mixture at a temperature between about 850° F. and 1250° F., recovering gaseous reaction products from the coker products and separating a gas rich in hydrogen from the gaseous reaction products.

2. A method according to claim 1 wherein the alkali metal compound comprises sodium hydroxide.

3. A method according to claim 1 wherein the alkali metal compound comprises sodium carbonate.

4. A method according to claim 1 wherein the alkali metal compound comprises a mixture of sodium hydroxide and sodium carbonate.

5. A method according to claim 1 wherein said gas rich in hydrogen comprises at least about 65 mol percent of hydrogen.

6. A method according to claim 1 wherein the aqueous solution of the alkali metal compound comprises a solution of sodium hydroxide in which the solution contains between about 5 and 50 wt. percent of sodium hydroxide and the amount of aqueous solution of the sodium hydroxide used on the oil feed is between about 1 and 20 wt. percent.

References Cited by the Examiner
UNITED STATES PATENTS

| | | | |
|---|---|---|---|
| 2,702,267 | 2/55 | Keith | 208—127 |
| 2,893,941 | 7/59 | Kohfeldt et al. | 208—127 |
| 2,895,896 | 7/59 | Vander Ploeg | 208—127 |
| 2,921,017 | 1/60 | Johnson et al. | 208—106 |
| 3,033,779 | 5/62 | Fidelman | 208—127 |

ALPHONSO D. SULLIVAN, Primary Examiner.